United States Patent [19]

Hodgson et al.

[11] 4,082,031
[45] Apr. 4, 1978

[54] GEAR HOBBING MACHINES

[75] Inventors: Brian Hodgson, Rowlands Gill; Robert Fairnington, Wylam; Malcolm Thorneycroft, Whitley Bay; Ronald Malcolm Grant, Chester le Street, all of England

[73] Assignee: Charles Churchill Limited, Coventry, England

[21] Appl. No.: 703,303

[22] Filed: Jul. 7, 1976

[51] Int. Cl.² .................................................. B23F 5/22
[52] U.S. Cl. ............................................ 90/4; 318/603
[58] Field of Search ............. 90/4; 51/95 GH, 52 HB; 83/71; 318/603

[56] References Cited

U.S. PATENT DOCUMENTS

| | | | |
|---|---|---|---|
| 2,483,810 | 10/1949 | Cotta | 90/4 |
| 2,484,856 | 10/1949 | Purvin | 90/4 |
| 3,414,785 | 12/1968 | Orahood et al. | 318/603 |
| 3,566,239 | 2/1971 | Taniguchi | 318/603 X |
| 3,610,299 | 10/1971 | Jureit | 83/71 |
| 3,748,962 | 7/1973 | Hilbert | 90/4 |
| 3,818,303 | 6/1974 | Rossel | 318/603 |

Primary Examiner—J. M. Meister
Attorney, Agent, or Firm—Watson, Cole, Grindle & Watson

[57] ABSTRACT

In a gear hobbing machine, the combination of a support, a rotatable hob, a slide mounting the hob for axial shifting on the support, a stepping motor operatively connected to the slide, electronic means operative at the conclusion of a hobbing cycle to apply drive pulses to the motor and thereby to cause the motor to impart a predetermined axial movement to the slide in response to each pulse, a subtractive counter for counting the pulses applied to the motor and means for stopping the motor when the count in the counter is reduced to zero.

4 Claims, 4 Drawing Figures

GEAR HOBBING MACHINES

BACKGROUND OF THE INVENTION

In a gear hobbing machine which is a hob, mounted on a spindle journalled in a hob slide cuts a gear blank mounted on a spindle which is carried by a work slide, the hob and gear blank are rotated in synchronism and, in each hobbing cycle, the hob and the gear blank approach one another prior to traverse of the hob past the work gear or vice versa and then are separated again.

The axis of the hob may extend vertically and the axis of the gear blank horizontally, or vice versa, or the two axes may both be horizontal and either the work slide or the hob may be advanced and retracted. In a typical case the axis of the hob is horizontal and that of the gear blank is vertical and the work slide is advanced towards the hob during each hobbing cycle, the hob then moving vertically to hob the gear blank, after which the work slide is then retracted and the hob is returned to its starting position.

During cutting only part of the length of the hob is engaged with the gear blank, and it is accordingly desirable to impart a short axial movement to the hob after each hobbing cycle so as to distribute the wear on the hob more evenly and thus increase its working life.

The object of the invention is to provide an improved and simplified form of hob shifting mechanism.

SUMMARY OF THE INVENTION

The invention accordingly provides, in a gear hobbing machine, the combination of a support, a rotatable hob, a slide mounting the hob for axial shifting on the support, a stepping motor operatively connected to the slide, electronic means operative at the conclusion of a hobbing cycle to apply drive pulses to the motor and thereby to cause the motor to impart a predetermined axial movement to the slide in response to each pulse, a subtractive counter for counting the pulses applied to the motor and means for stopping the motor when the count in the counter is reduced to zero. Accordingly, the hob can be arranged to move axially between hobbing cycles by an amount determined by the count set in the subtractive counter.

DESCRIPTION OF THE DRAWINGS

An embodiment of gear hobbing machine according to the invention is illustrated, by way of example, in the accompanying drawings, in which.

DESCRIPTION OF THE PREFERRED EMBODIMENT

Figure 1:
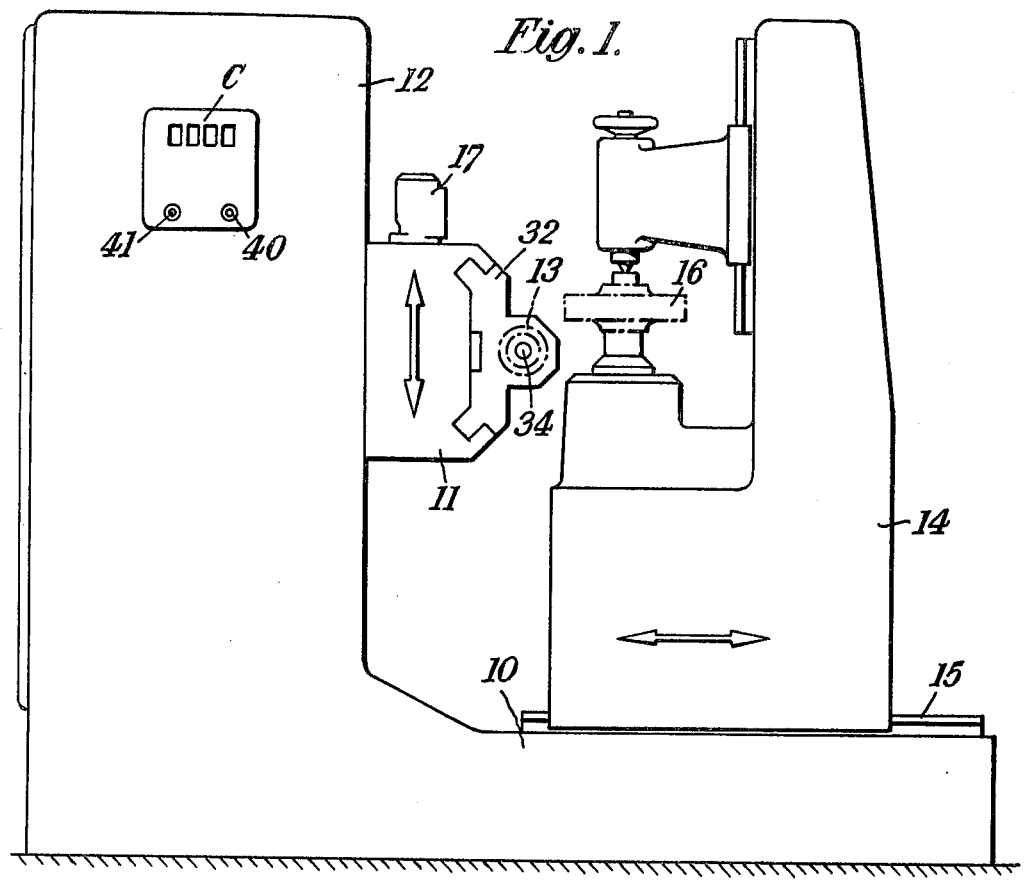
FIG. 1 is a front elevational view of the machine.

The hobbing machine shown in FIG. 1 comprises a base 10, carrying a column 12 on which a hob slide 11 is mounted for vertical sliding movement. A hob 13 is mounted for rotation in the hob slide 11 about a horizontal axis. A work slide 14 which is mounted to slide on a slideway 15 on the base 10 supports a gear blank 16 to be hobbed for rotation about a vertical axis. A conventional mechanism, not shown, is provided for rotating the hob 13 and the gear blank 16 in synchronism, for moving the hob and the gear blank into engagement, and for traversing the hob past the gear blank.

Figure 2:
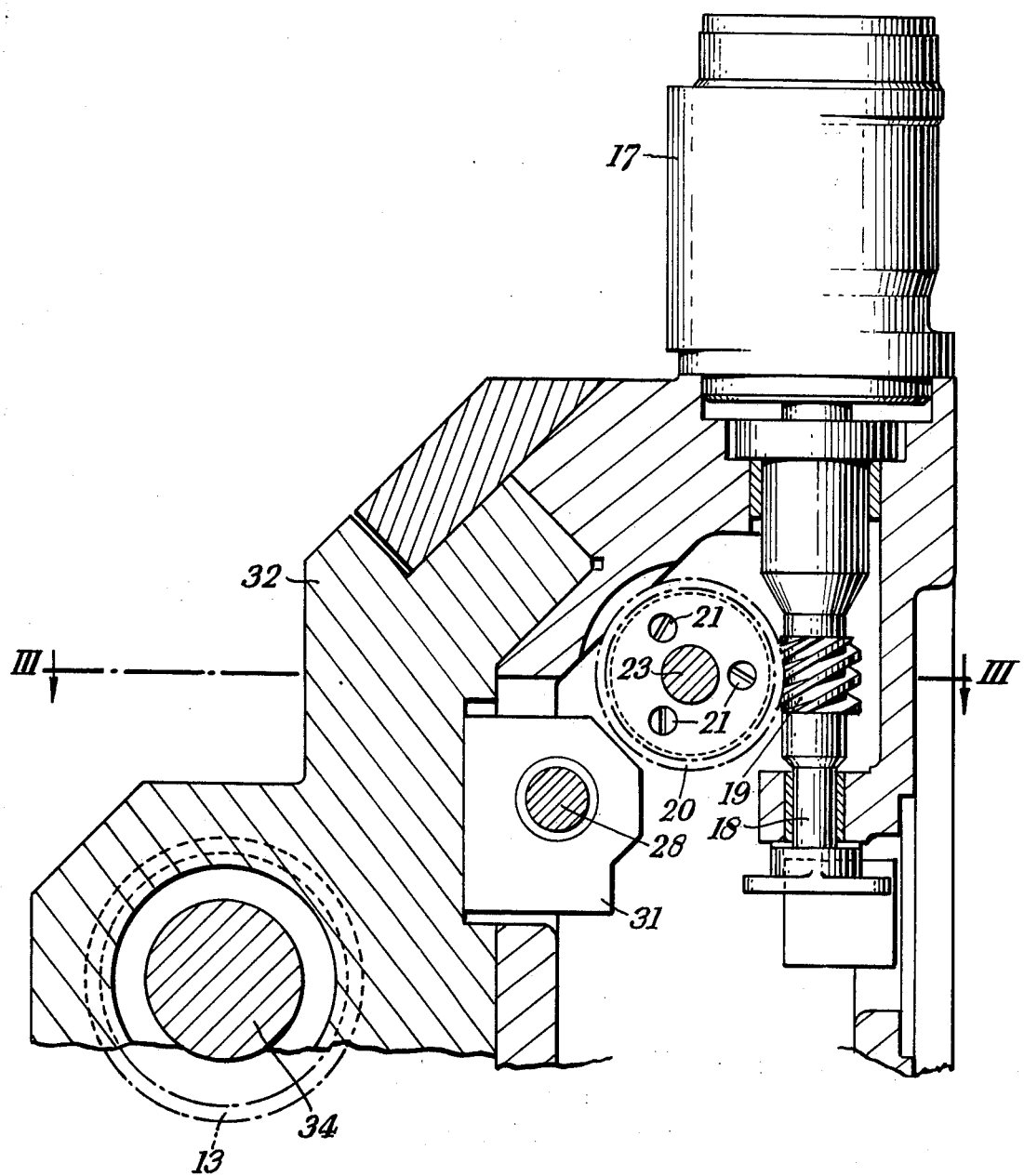
FIG. 2 is a rear elevational view, partly in section, on a larger scale.

As illustrated in FIG. 2, the hob-shifting mechanism is provided which comprises an electric stepping motor 17 which is capable of reversible rotation. The motor 17 drives a shaft 18 mounted in bearings in the machine frame, and which carries a worm 19 which meshes with a wormwheel 20.

Figure 3:
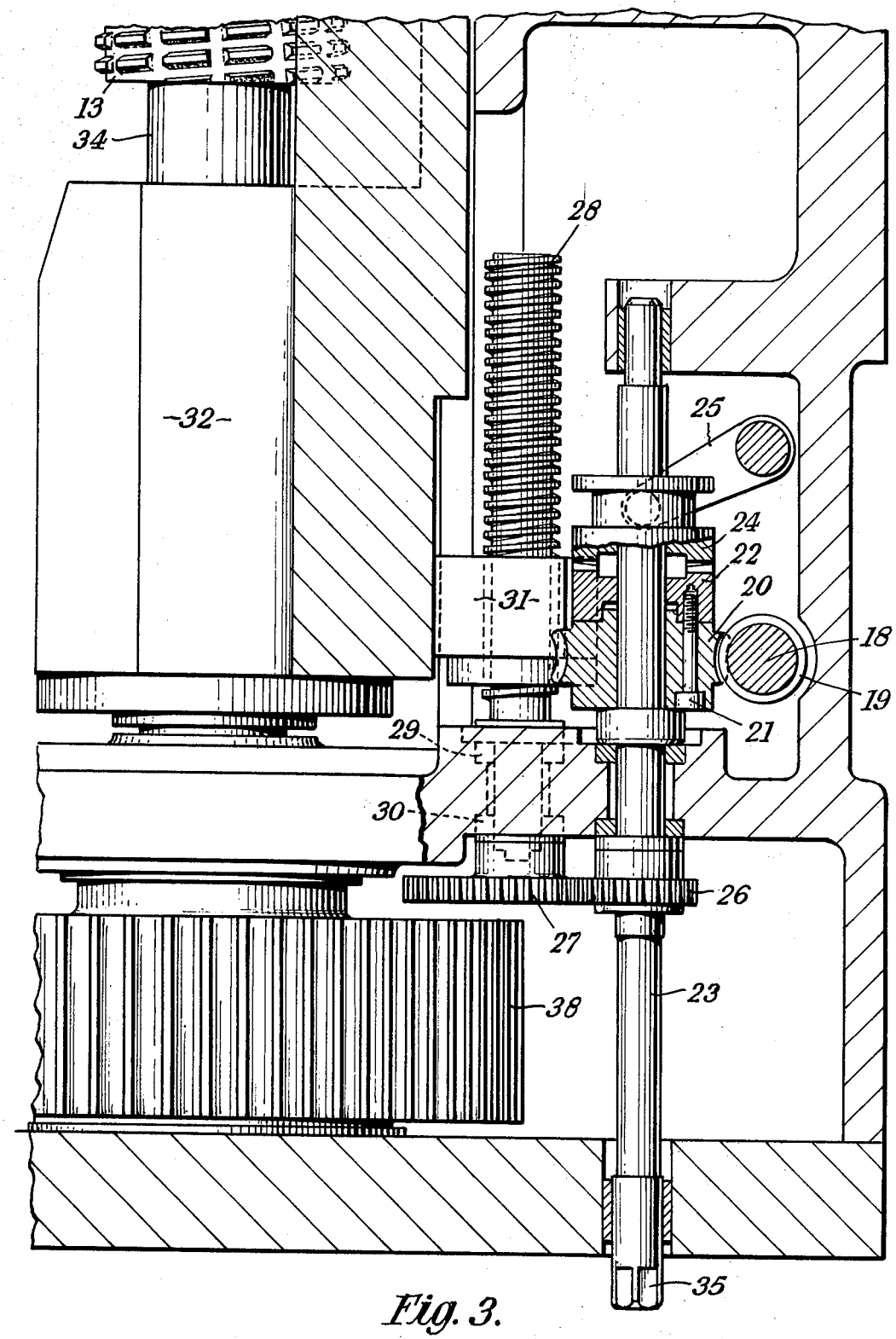
FIG. 3 is a sectional view along the line III—III in FIG. 2.

As shown in FIG. 3, the wormwheel 20 is attached by screws 21 to a clutch member 22, both being loose on a shaft 23 mounted in bearings in the machine frame. The clutch member 22 is normally in engagement with a clutch member 24 which is rotationally fast on the shaft 23 and is movable axially by a clutch lever 25 to engage or disengage the clutch. The shaft 23 carries a gear 26 which drives a gear 27 on a screw 28 which is rotatable in bearings 29, 30 but restrained against longitudinal movement. A nut 31 on the screw 28 is fixed to a slide 32 carrying the hob 13 and its arbor 34. The arbor 34 has a tapered end (not shown) engaging a drive shaft (also not shown) to which is splined a gear 38 which serves to rotate the hob 13. The arbor 34 is thus free to move axially with respect to the gear 38.

Operation of the stepping motor 17 therefore serves, so long as the clutch 22, 24 is engaged, to rotate the shaft 23 and the screw 28 and advance the hob 13 through the agency of the nut 31.

The hob may be shifted manually by disengaging the clutch and applying a tool to the end 35 of the shaft 23.

Figure 4:
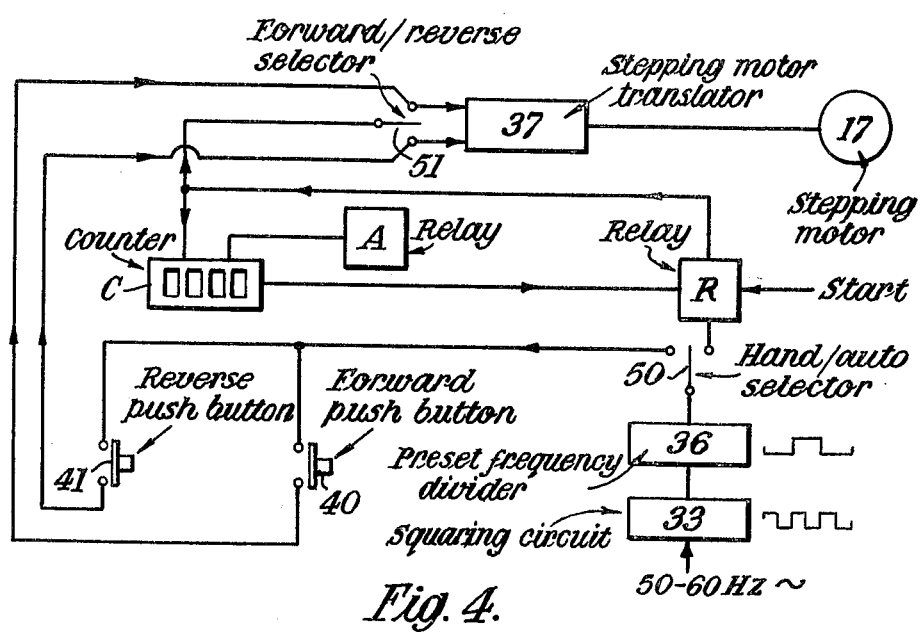
FIG. 4 is a circuit diagram.

FIG. 4 shows the basic operation of the control system. A signal at the normal power frequency is applied to a squaring circuit 33, the output of which is passed to a preset frequency divider 36. The output pulses from the divider 36 are fed to a proprietary stepping motor drive translator 37 under the control of a relay R. The translator 37 converts the pulses which it receives into the switching sequence needed to drive the stepping motor 17.

When the relay R is energized, it allows pulses to pass from the frequency divider 36 to the translator 37 which causes the stepping motor 17 to rotate at a predetermined incremental rate, the size of the increment being determined by the characteristics of the stepping motor and the mechanical gearing described above.

The pulses are also passed by the relay R to a subtractive electro-mechanical counter C contained in the control panel of the machine as shown in FIG. 1.

In operation, a number of pulses corresponding to a predetermined desired movement of the hob 13 is dialled up on the subtractive counter C. The relay R is energized by a signal from a limit switch (not shown), which is operated when the hob 13 and the workpiece 16 are separated at the end of a hobbing cycle, to start the stepping motor 17. As the hob shift progresses, the count in the counter is reduced to zero, and on reaching zero the relay R is de-energized to cut off the supply of pulses to the translator 37, thereby stopping the rotation of the stepping motor 17.

The counter C is reset by a second relay A which is preset by a limit switch (not shown) at some convenient point in the hobbing cycle. When the count in the counter C becomes zero, operation of the relay R to stop the stepping motor 17 also actuates the relay A to cause it to reset the desired count in the counter.

The use of the second relay A ensures that there is a time delay between the counter C reaching zero and resetting to its original count, which is sufficient to allow the relay R to operate and the motor 17 to stop before resetting is initiated, and also allows the electrical logic to signal "end of cycle".

When full axial traverse of the hob is completed, another limit switch (also not shown) is actuated to prevent any further hobbing cycles from taking place.

The circuit includes a hand-auto selector switch 50 by which the stepping motor 17 may be operated either automatically under control of pulses from the divider 36, as described above, or manually under control of forward and reverse push buttons 40, 41 and another selector switch 51. After full axial traverse of the hob has been completed and the limit switch just mentioned has been actuated, the button 41 is operated to cause the translator 37 to generate an electrical supply to the motor 17 to cause the motor to rotate in reverse and return the hob to its original position.

The counter C is a standard proprietary unit and it provides form manual or electrical re-setting. Normally the increment of axial hob shift and hence the dialled reading are the same for each cycle, but they can be varied at the discretion of the operator.

What we claim as our invention and desire to secure by Letters Patent is:

1. In a gear hobbing machine, the combination of a support, a rotatable hob, a slide mounting the hob for axial shifting on the support, a stepping motor operatively connected to the slide, a pulse source comprising a squaring circuit for deriving square pulses from the power supply and a frequency divider connected to the output of the squaring circuit, a relay energizable at the conclusion of a hobbing cycle and operative, when energized, to apply pulses from said frequency divider to the motor and thereby to cause the motor to impart a predetermined axial movement to the slide in response to each pulse, a subtractive counter for counting the pulses applied to the motor and a connection between the counter and the relay and operative to de-energize the relay, and thereby stop the motor, when the count in the counter is reduced to zero.

2. A hobbing machine as claimed in claim 1, which includes a further relay operative to reset the relay after the count therein has been reduced to zero.

3. A hobbing machine as claimed in claim 1, which includes a translator associated with the motor for controlling incremental movement of the motor in response to the pulses and manually operable means for controlling the translator to impart reverse rotation to the motor to return the hob to its initial position.

4. A hobbing machine as claimed in claim 1, which includes a first shaft coupled at one end to the motor, a second shaft, a clutch for engaging the first shaft with and disengaging it from the second shaft, a screw, gearing connecting said screw to said second shaft to be rotated by said second shaft, means restraining said screw against axial movement and a nut carried by said slide and engaging said screw.

* * * * *